Aug. 7, 1945.   R. A. NOBLE   2,381,836
CALCULATING DEVICE
Filed July 17, 1944   4 Sheets-Sheet 2

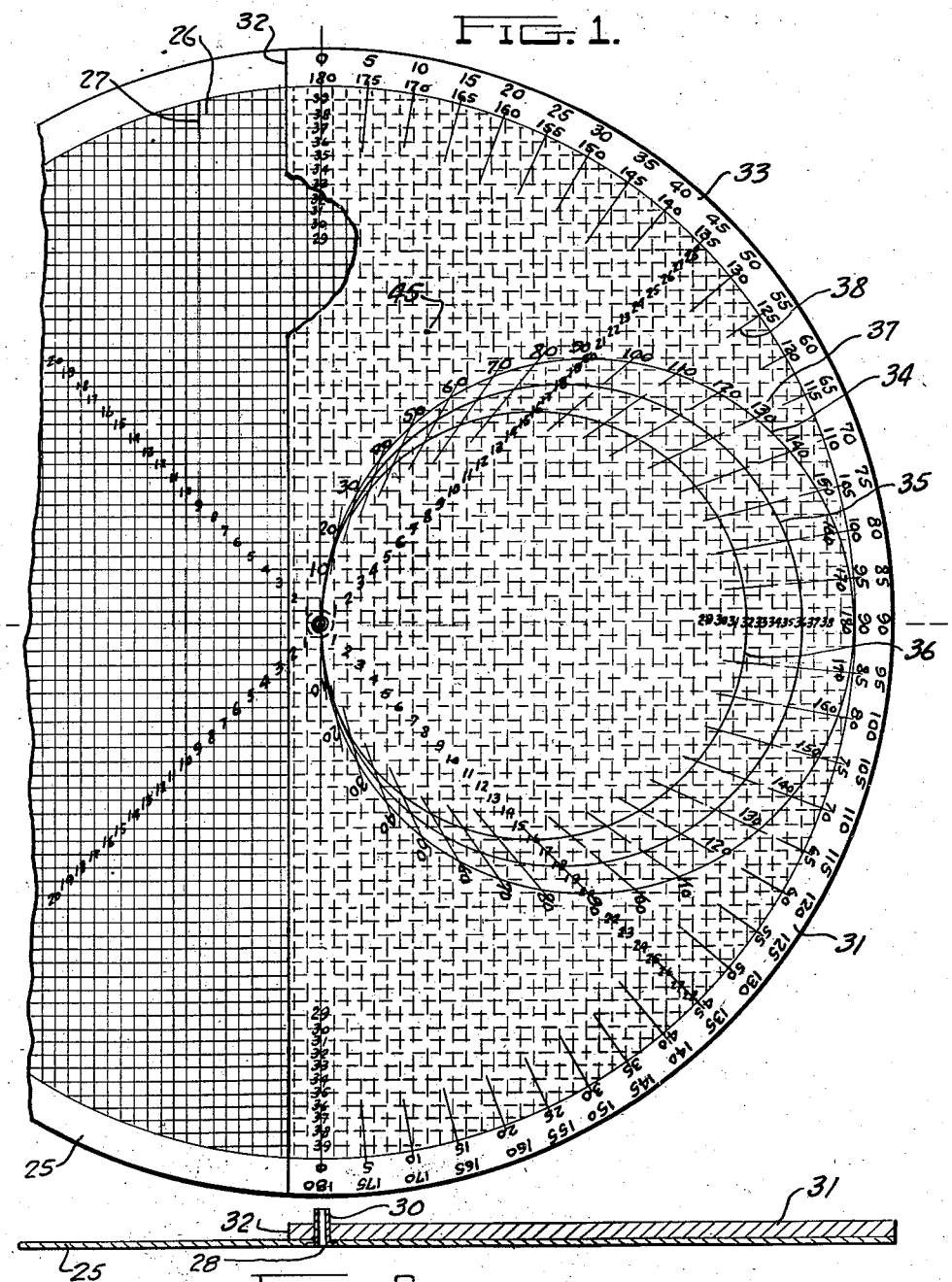

INVENTOR.
Ross A. Noble
BY
Barnes, Kisselle, Laughlin & Raisch
Attorneys

Aug. 7, 1945.　　　　R. A. NOBLE　　　　2,381,836
CALCULATING DEVICE
Filed July 17, 1944　　　4 Sheets-Sheet 3

INVENTOR.
Ross A. Noble
BY

Aug. 7, 1945.   R. A. NOBLE   2,381,836
CALCULATING DEVICE
Filed July 17, 1944   4 Sheets-Sheet 4

INVENTOR.
Ross A. Noble
BY
Barnes, Kisselle, Laughlin & Raisch
Attorneys

Patented Aug. 7, 1945

2,381,836

UNITED STATES PATENT OFFICE 2,381,836

CALCULATING DEVICE

Ross A. Noble, Flint, Mich.

Application July 17, 1944, Serial No. 545,368

5 Claims. (Cl. 33—1)

This invention relates to a device for ascertaining and determining the adjustable positions and movements to be given to an adjustable mounting for a bushing or bearing or the like, in order to accurately locate the hole center of the bushing or bearing. The device of the present invention may be considered to be a calculating device.

There is shown in my application, Serial No. 507,502, filed October 25, 1943, an adjustable mounting with which the present calculating device is to be employed. The device shown in the application recites briefly the following structure which had best be disclosed herein in order that the calculating device and its use may be understood; first, there is a suitable supporting structure; an adjusting member is rotatably adjustable in the supporting structure; a second adjustable member is rotatably mounted within the first adjustable member and its center of rotation is eccentrically positioned relative to the center of rotation of the first adjustable member; the second adjustable member has an opening therein which may provide or support a bearing or bushing or the like; this opening is eccentrically positioned in the second adjustable member; the eccentricity of the second adjustable member relative to the first adjustable member and the eccentricity of the opening in the second adjustable member are preferably equal. By suitable rotatable adjustments of the adjustable members, the center of the opening can be accurately positioned in a multiplicity of locations but where the actual machinery is not large, as is usually the case, the difficulty is that of ascertaining the extent and amount of adjustments which are to be made. Accordingly, the object of the present invention is, primarily, to provide a calculating device which will quickly and easily show the extent and direction of rotatable adjustments to be given to both the rotatably adjustable members to bring the center of the opening at a known accurate location. Other objects will be better understood by consideration of the following detailed description.

The accompanying drawings show a device for carrying out the invention and also show structures with which the device is to be used.

In these drawings:

Fig. 1 is a plan view of a calculating device constructed in accordance with the invention.

Fig. 2 is a sectional view taken through Fig. 1 showing the structural elements.

Figure 6:
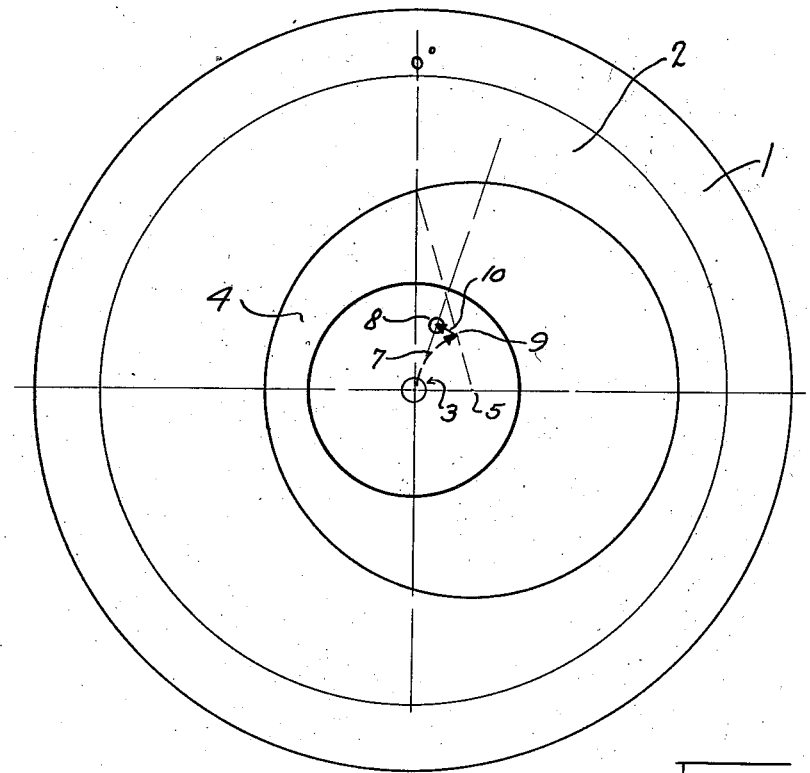
Fig. 6 is a rather diagrammatic view illustrating the mechanical structure which is to be adjusted by the use of the calculating device.
Figure 7:
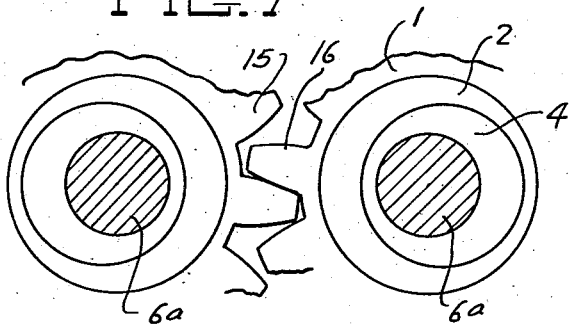
Fig. 7 shows a gearing arrangement embodying the adjustable mounting of gears.
Figure 8:
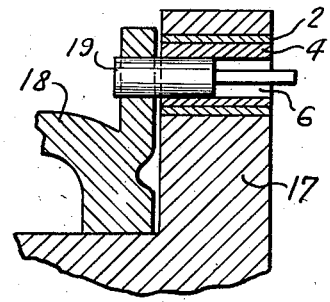
Fig. 8 is a view illustrating the adjustable mechanism used in connection with a gauge block.

Referring first to Figs. 6, 7, and 8: In Fig. 6 a support is shown at 1, and rotatably mounted in the support is an outer adjustable member 2, the center of rotation of which is at 3. A second rotatably adjustable member, shown at 4, is eccentrically disposed within the member 2. The center of rotation of the second member is shown at 5. The second member 4 carries a suitable bushing or provides a guide for a shaft or support for the shaft or any other suitable device or element which is to be accurately located on a center, and to this end the second member has an eccentric opening 6 therein.

The eccentricity of the opening 6 is preferably equal to the eccentricity of the member 4. Accordingly, the parts may be adjusted, as shown in Fig. 6, so that the center of the opening 6 coincides with the center of the member 2. This may be considered a zero position. By rotating the member 4 within the member 2, the center of the opening may be caused to traverse a complete circle along the arc represented at 7. This rotation is about the center 5. By rotating the outer member 2, the center of the opening 3 may move through a complete circle on a radius depending upon the distance of the center of the opening from the center 3. Suppose, for example, that it is desired that the center of the opening be adjusted to the point 8; first, the inner member 4 is rotated to move the opening center along the arc 7 to a point 9. This point is on a radius from the center 3, equal to the radius of the point 8. The member 4 is now locked in position. The member 2 may now be rotated and the center of the opening moves along the arc 10 and may be brought to the point 8, at which time the outer member 2 is locked in position. Accordingly, it will be observed that the center of the opening may, by manipulation of the member 4, be adjustably positioned from the center 3 to a point on any radius equal to twice the eccentricity; i. e. twice the distance between the centers 3 and 5; that having thus been adjusted to the proper radius, the center may be adjusted throughout 360° to locate the center at any desired point in the field. In ordinary sized machinery, the eccentricity, or in other words, the distance between the centers 3 and 5 may be about .002 of an inch, although this may be varied. The computing device of the present invention is to be employed to easily and quickly ascertain the angle of movement given to the two rotatably adjustable members to locate the center of the opening at any desired point.

Fig. 7 shows two gears 15 and 16 with intermeshing teeth and with each gear having such a mounting. The reference characters employed in Fig. 6 are used in Fig. 7 to show the corresponding parts. The shafts of gears are shown at 6a and are mounted in the inner adjustable member 4, in turn mounted in the member 2 which in turn is in the support 1.

In Fig. 8, there is a gauge block 17 for gauging an opening in a work piece 18. The gauge block constitutes the support having an opening for the reception of the outer adjustable member 2, which receives the inner adjustable member 4 with its opening 6 through which a gauge member 19 functions to gauge the work piece. It will readily be appreciated that warping or shrinkage of material and errors in manufacturing can be met and overcome by the accurate positioning of the center of the opening 2 through the means of the adjustment.

The calculating device is relatively simple insofar as its structure is concerned. It comprises a base member which may be circular, as shown at 25, divided into a multiplicity of increments by cross lines 26 and 27. The center of this base member is at the intersection of the central cross lines, as at 28, and the cross lines are numbered progressively from the center by suitable numbering of the indicia 29. This base member carries an axis member or pintle 30 disposed on its center. The base member may be made of any suitable material, preferably a material having a low co-efficient of expansion.

For cooperation with the base member is an adjustable or gauging member 31. This member is preferably transparent and it can be made of any material suitable for the purpose, such as a plastic or glass, and it is arranged to overlie the base and swivel on the pintle 30, as is shown in Fig. 2. This base member may be segmental or semi-circular in shape and, as shown in Figs. 1 and 2, it exceeds the semi-circular shape just enough to provide for its swiveling on the pintle 30, its chordal edge being illustrated at 32.

Figure 4:
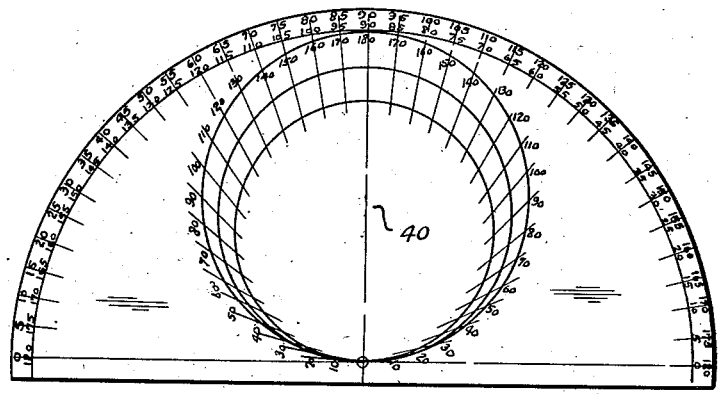
Fig. 4 is an ensmalled plan view of the adjusting piece or segment.

The gauging member 31 has suitable degree markings advantageously arranged around its peripheral or curved edge, as shown by the indicia 33, and the degree markings may be doubly arranged in reverse position so that the same can be easily read from either end. As shown, the degree markings cover 180°. Inscribed upon the member 31 is one or more circles; three circles are shown in Fig. 2, as at 34, 35 and 36. Suitable indicia is also inscribed upon the gauging member to indicate the angular extent from a zero position which is at the center 28, this indicia being shown as comprising the numerals 37 and radial lines 38. The gauging device itself, insofar as its structure is concerned, may be readily appreciated as reference to Fig. 4. The center of the outer circle 34 is illustrated at 40.

The calculating device, as shown in Fig. 1, is made many times larger than the machine to be adjusted and, therefore, minutely small increments of adjustment can be obtained. For an example, in one device which has been made the size was increased 2000 times. In this device, which was based upon an eccentricity of .002 of an inch, that is, .002 of an inch between the points 3 and 5, the diameter of the circle 34 was eight inches; or in other words, the relationship between the eccentricity in the machine and the circle 34 was .002 to 4 inches.

Figure 5:
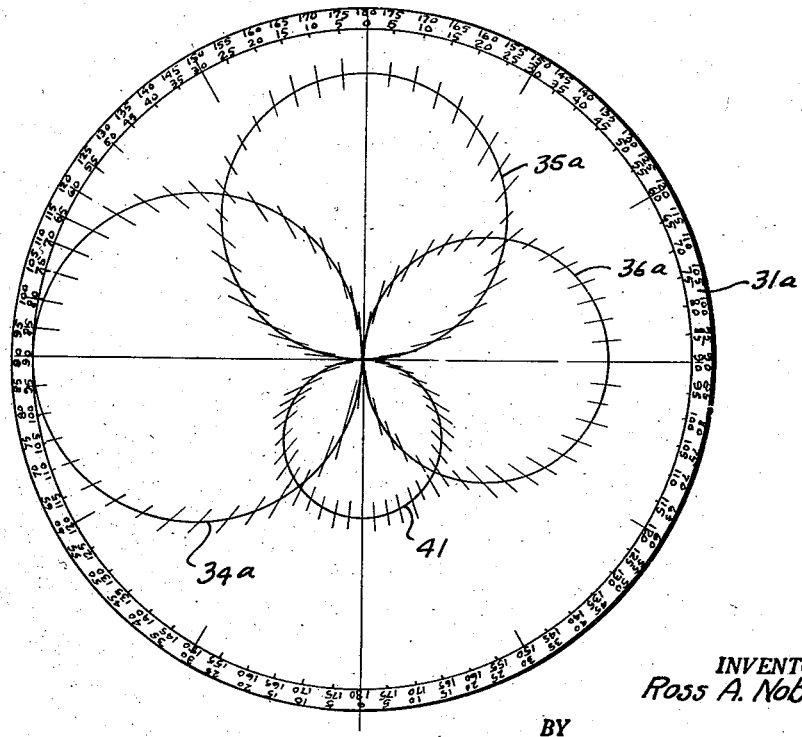
Fig. 5 is a plan view of a modified form.

The gauging element 31 may have a number of circles as indicated for different machines having different eccentricities. For example, the circle 34 may be for a machine having an eccentricity of .002 of an inch; the circle 35 corresponds to an eccentricity something less than .002 of an inch and the circle 36 corresponds to an eccentricity still lower. In the form shown in Fig. 5, the gauging member 31a is in the form of a complete circle and instead of placing the gauging circles within each other as shown in Fig. 1, the gauging circles may be arranged about the center. As shown in Fig. 5, there are four gauging circles 34a, 35a, 36a and a smaller one 41. This arrangement eliminates the problem where the perimeter of the circles come near each other and coincide at the center 28 which makes it difficult to read the calculator in some instances.

In use, in the making of an adjustment on a piece of machinery, the eccentricity of that machinery is, of course, known and for the present purpose let it be assumed that this is .002 of an inch and, therefore, the circle 34 is to be used. The actual parts 2 and 4 of the machine may be placed in an initial starting position as is shown in Fig. 6, with the centers 5 and 3 lined up on the center line and with the aperture 6 coinciding with the center 3 of the outer member 2. The base and the gauging member of the calculating device are positioned as is shown in Fig. 1, with the zero line on the base member lined up with the zero position on the gauging position. In other words, the zero position of the indicia 33 is lined up with the zero line 27 on the base member which intersects the member 28. In this starting position the gauging member 31 may be located in any one of four positions with the zero indicia lined up either with the center lines 27 or the center lines 26.

Figure 3:
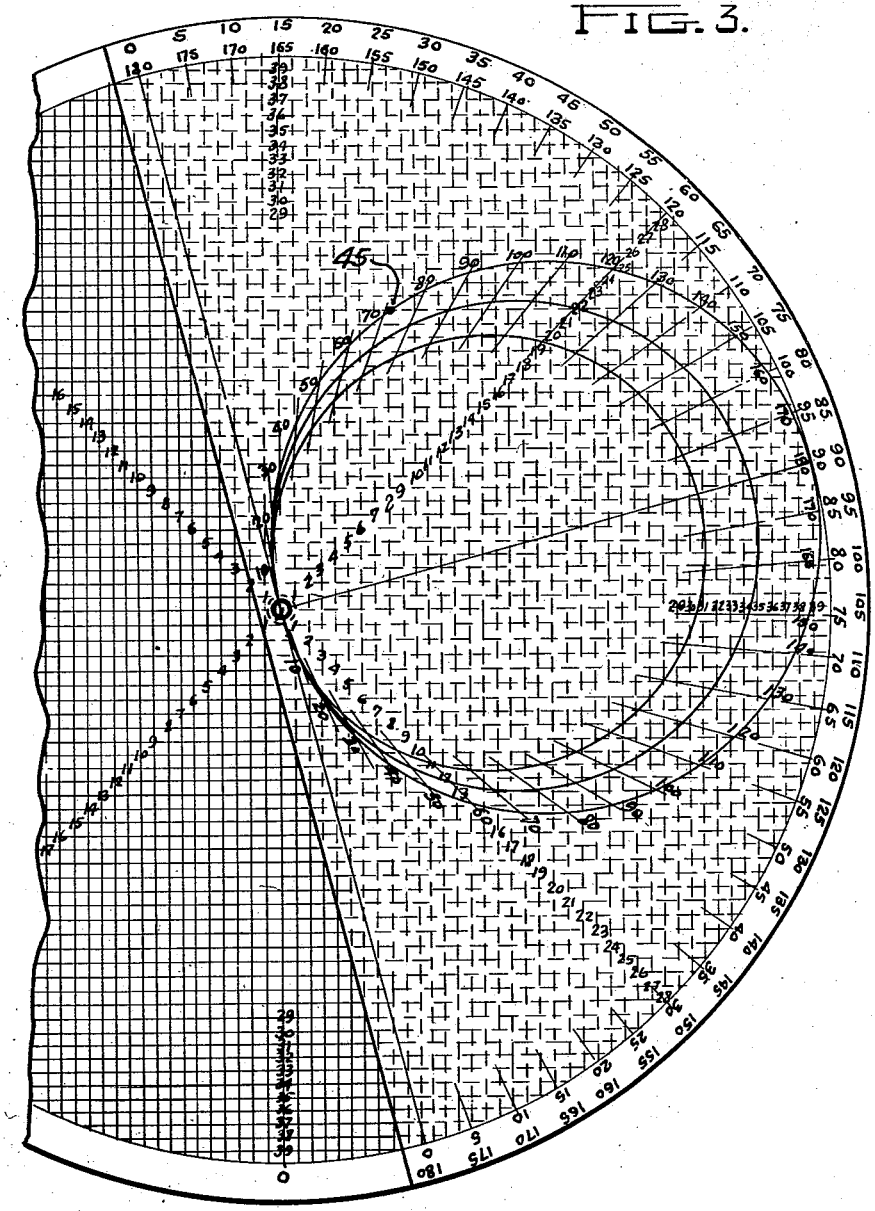
Fig. 3 is a view of the device in a position into which the device is manipulated for ascertaining a certain adjustment of the mechanical structure to be adjusted.

Now, taking a specific problem, let it be assumed that the center of the opening 6 is to be located at a point corresponding to the intersection of the line 8 and the line 22, as indicated at 45. The gauging member 31 is now rocked counter-clockwise, as Fig. 1 is viewed, to the position shown in Fig. 3 where the circle 34 intersects the point 45. The degree indicia 37 shows that this intersection is at 71° on the circle 34. Therefore, this indicates that the inner eccentric member 4 is to be rocked clockwise 71° and there locked in position. The indicia 37 thus indicates not only the direction of movement of the eccentric member 4 but also the angle through which it is adjusted. Now, the indicia 33 shows that the gauging member has been moved through an angle of 16°. This indicates that the outer member 2 is now to be rotated through 16° and then locked in position. It also indicates the direction of rotation. When this is done the center of the bearing or bushing 6 or the shaft 6a or whatever mechanical piece is associated with the mounting, is accurately positioned at a point corresponding to the desired point of adjustment 45. As above explained, the adjustment of the inner member 4 moves the bushing center through the arc 7; the rocking of the outer member 2 rocks the center through the arc 10. The calculating device of the present invention gives, with a single adjusting movement, an accurate indication of the angular movements to be given to the two adjustable members of the apparatus. Should the desired location of adjustment be in some other position, it may be that the gauging member 31 is to be rotated clockwise instead of counter-clockwise. This indicates a clockwise adjustment of the machinery.

I claim:

1. A calculating device for ascertaining adjustable movements to be made in a mechanical apparatus which has an outer rotatably adjustable member, an inner rotatably adjustable member mounted eccentrically in the outer member, the inner member having a formation such as an opening or bushing or bearing or the like eccentrically positioned therein, for the purpose of rotatably adjusting the inner and outer members to position the center of said formation in the field covered by the amount of eccentricity, comprising a base member having a center of rotation, said base member having means dividing it into increments of spacing from the center of rotation laterally in two directions, a gauging member pivotally mounted at the center of rotation, means forming at least part of a circle on the gauging member, the center of the circle being eccentrically disposed relative to the center of rotation, indicia on the gauging member for indicating the angle of rotation along the circle or part thereof and indicia for showing the angle of adjustment through which the gauging member is moved about the center of rotation.

2. A calculating device for ascertaining adjustable movements to be made in a mechanical apparatus which has an outer rotatably adjustable member, an inner rotatably adjustable member mounted eccentrically in the outer member, the inner member having a formation such as an opening or bushing or bearing or the like eccentrically therein, for the purpose of rotatably adjusting the inner and outer members to position the center of said formation in the field covered by the amount of eccentricity, the eccentricity of the inner member relative to the outer, and the eccentricity of the formation relative to the inner member being equal, comprising a base member having a center of rotation, said base member having means dividing it into increments of spacing from the center of rotation laterally in two directions, a gauging member pivotally mounted at the center of rotation, means forming at least part of a circle on the gauging member, the center of the circle being eccentrically disposed relative to the center of rotation and the periphery thereof intersecting the center of rotation, indicia on the gauging member for indicating the angle of rotation along the circle or part thereof and indicia for showing the angle of adjustment through which the gauging member is moved about the center of rotation.

3. A calculating device for ascertaining adjustable movements to be made in a mechanical apparatus which has an outer rotatably adjustable member, an inner rotatably adjustable member mounted eccentrically in the outer member, the inner member having a formation such as an opening or bushing or bearing or the like eccentrically positioned therein, for the purpose of rotatably adjusting the inner and outer members to position the center of said formation in the field covered by the amount of eccentricity, comprising a base member having a center of rotation, said base member having means dividing it into increments of spacing from the center of rotation laterally in two directions, a gauging member pivotally mounted at the center of rotation, means forming at least part of a circle on the gauging member, the center of the circle being eccentrically disposed relative to the center of rotation and the periphery thereof intersecting the center of rotation, indicia on the gauging member for indicating the angle of rotation along the circle or part thereof, indicia for showing the angle of adjustment through which the gauging member is moved about the center of rotation, the gauging member being transparent so that the increments of spacing on the base member are visible therethrough.

4. A calculating device for ascertaining adjustable movements to be made in a mechanical apparatus which has an outer rotatably adjustable member, an inner rotatably adjustable member mounted eccentrically in the outer member, the inner member having a formation such as an opening or bushing or bearing or the like, eccentrically positioned therein, for the purpose of rotatably adjusting the inner and outer members to position the center of said formation in the field covered by the amount of eccentricity, comprising a base member having a center of rotation, said base member having means dividing it into increments of spacing from the center of rotation laterally in two directions, a gauging member pivotally mounted at the center of rotation, means forming at least part of a circle on the gauging member, the center of the circle being eccentrically disposed relative to the center of rotation and the periphery thereof intersecting the center of rotation, indicia on the gauging member for indicating the angle of rotation along the circle or part thereof, indicia for showing the angle of adjustment through which the gauging member is moved about the center of rotation, the indicating member, after having been set in a zero starting position, being rotatable about the center of rotation and adapted to be so rotated until the circle or part thereof intersects a point shown by the increments of spacing to where the said formation is to be adjusted and the indicia along the circle or part thereof at said intersection showing the required angular movement to be given to the inner adjustable member and the indicia for showing the angular movement of the gauging member relative to the base member showing the required angular adjustment of the outer adjustable member.

5. A calculating device for ascertaining adjustable movement to be made in a mechanical apparatus which has an outer rotatably adjustable member, an inner rotatably adjustable member mounted eccentrically in the outer member, the inner member having a formation such as an opening or bushing or bearing, or the like, eccentrically positioned therein for the purpose of rotatably adjusting the inner and outer members to position the center of said formation in the field covered by the amount of eccentricity, comprising a base member having a center of rotation, said base member having means dividing it into increments of spacing from the center of rotation laterally in two directions, a gauging member pivotally mounted at the center of rotation, means forming at least part of a circle on the gauging member, the center of the circle being eccentrically disposed relative to the center of rotation and the periphery thereof intersecting the center of rotation, the circle or part thereof having its size many fold times the size of the eccentricity of the members in the mechanical apparatus and representing the field of adjustment thereof, indicia on the gauging member for indicating the angle of rotation along the circle or part thereof and indicia for showing the angle of adjustment through which the gauging member is moved about the center of rotation.

ROSS A. NOBLE.